United States Patent [19]
Cox et al.

[11] 4,266,252
[45] May 5, 1981

[54] LENS SYSTEM FOR DOCUMENT SCANNING

[75] Inventors: Arthur Cox, Chicago; John A. Thiel, Wheeling, both of Ill.; Eugene Nodov, Richardson, Tex.

[73] Assignee: The Mead Corporation, Dayton, Ohio

[21] Appl. No.: 75,067

[22] Filed: Sep. 12, 1979

[51] Int. Cl.³ .......................... H04N 1/10; G02B 9/62
[52] U.S. Cl. ..................... 358/293; 358/205; 358/225; 358/179; 350/6.3; 350/464; 350/486
[58] Field of Search ............. 358/293, 199, 205, 206, 358/285, 286, 225; 350/285, 214, 215, 6.2, 6.3

[56] References Cited

U.S. PATENT DOCUMENTS

| | | | |
|---|---|---|---|
| 2,262,584 | 11/1941 | Herriott | 358/285 |
| 3,370,905 | 2/1968 | Hudson | 350/215 |
| 3,436,145 | 4/1969 | Bechtold | 350/215 |
| 3,681,527 | 8/1972 | Nishiyama | 358/286 |
| 3,709,602 | 1/1973 | Satomi | 355/49 |
| 3,733,115 | 5/1973 | Cox | 350/214 |
| 3,752,558 | 8/1973 | Lloyd | 350/6 |
| 4,013,348 | 3/1977 | Yamada | 350/215 |
| 4,025,154 | 5/1977 | Yuta | 350/7 |
| 4,112,469 | 9/1978 | Paranjpe | 358/296 |

*Primary Examiner*—Marc E. Bookbinder
*Assistant Examiner*—Edward L. Coles
*Attorney, Agent, or Firm*—Biebel, French & Nauman

[57] ABSTRACT

A lens system for scanning a document positioned on a flat support. The lens system operates in cooperation with apparatus which scans a beam of illuminating light across the document and a scanning mirror, which directs reflected light from the illuminated document in a direction toward an array of photodetectors. The lens system is positioned between the scanning mirror and the photodetector array and includes a movable doublet lens and fixed doublet lens. The movable doublet lens collimates the light through the lens system, while the fixed doublet lens focuses an image of the scanned document portion upon the face of a photodetector array. A set of 6 correcting lenses are arranged symmetrically with respect to a plane of symmetry in a position between the two doublet lenses. A barrel cam and a follower arrangement is provided for moving the movable doublet lens in synchronism with the image scanning mirror, so that optical field flattening is achieved.

10 Claims, 6 Drawing Figures

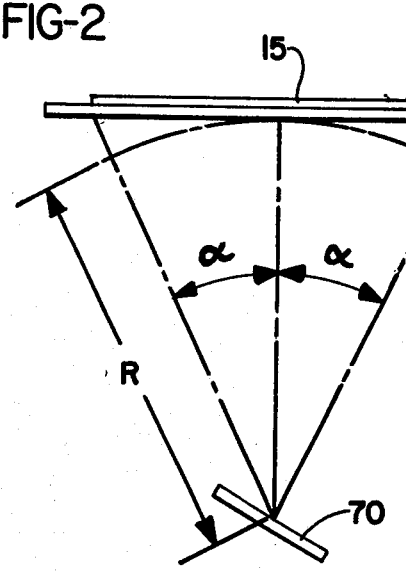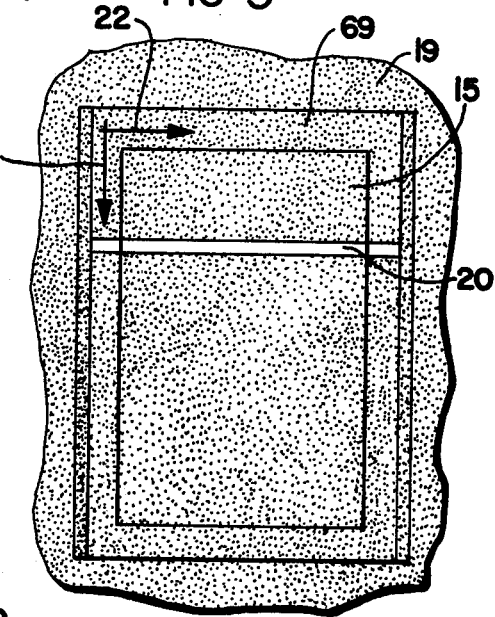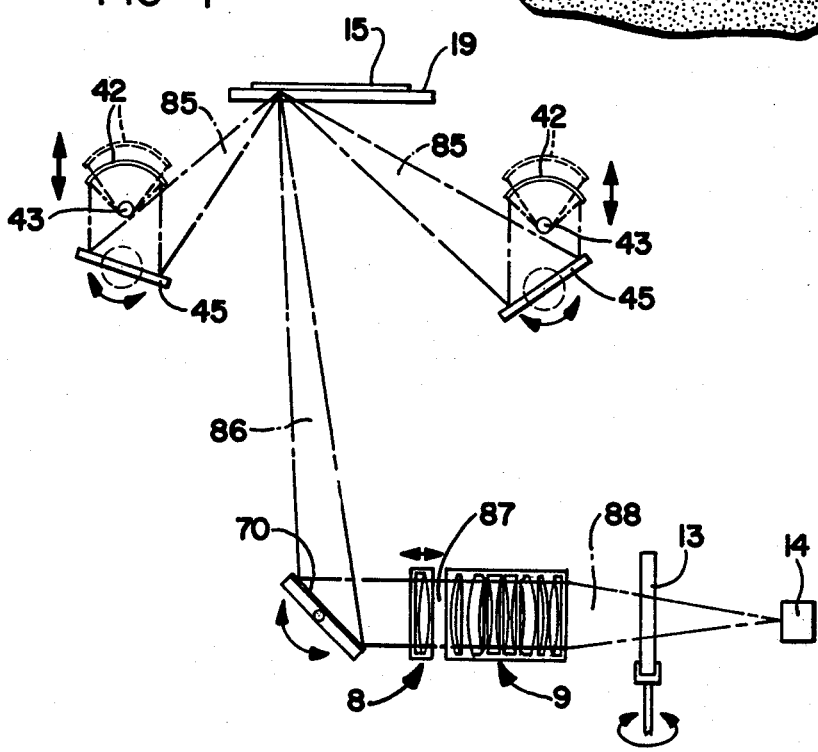

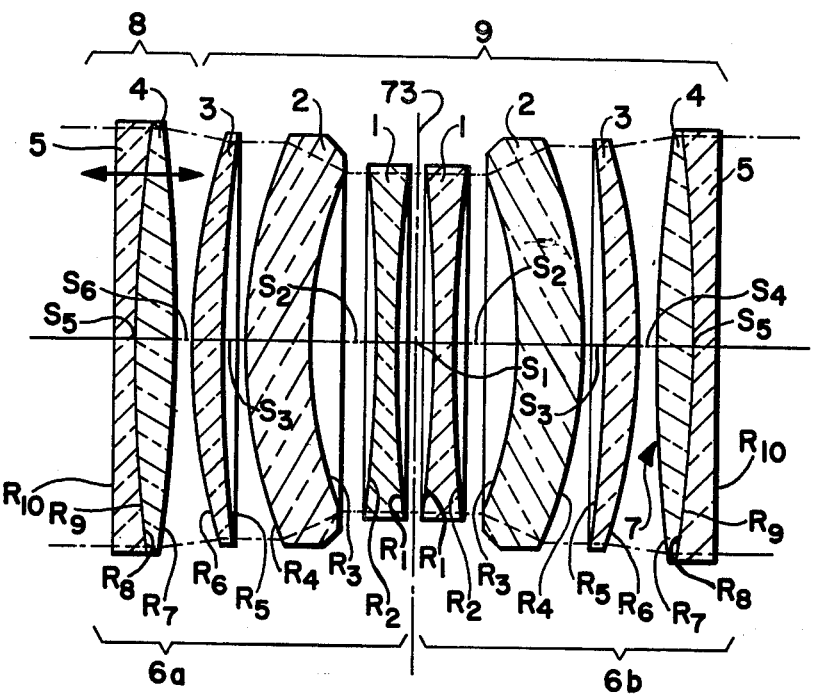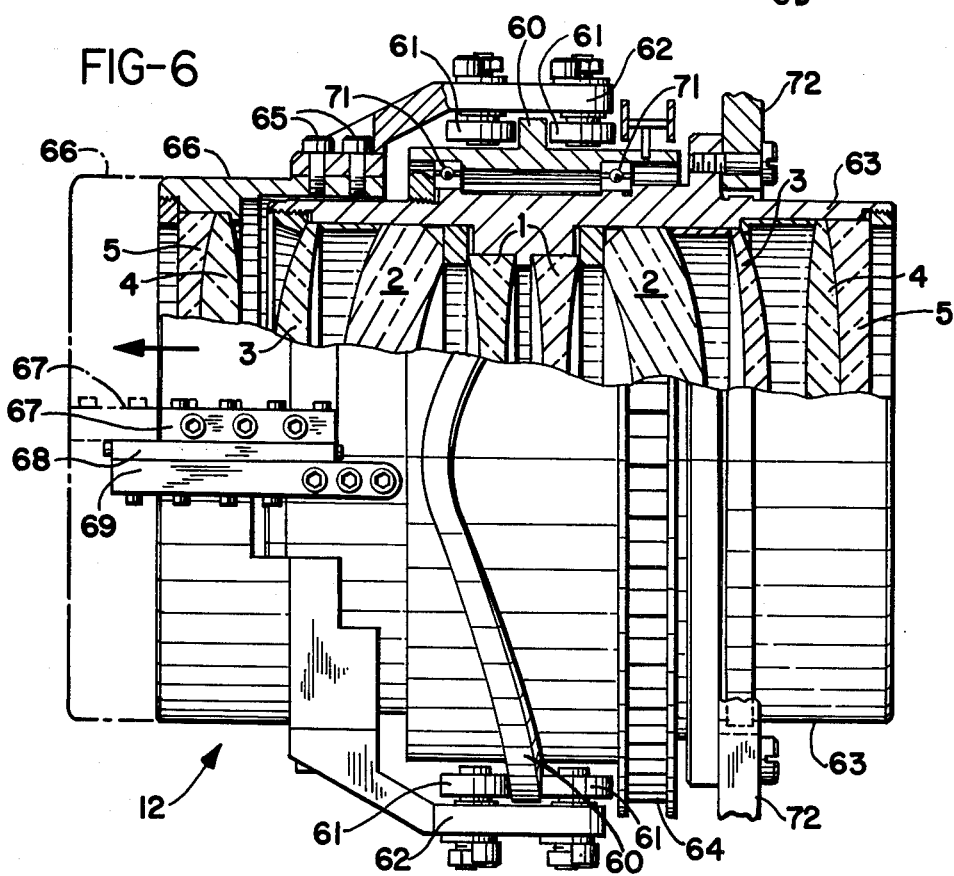

LENS SYSTEM FOR DOCUMENT SCANNING

CROSS-REFERENCE TO RELATED APPLICATIONS

This application is related to application Ser. No. 075,052 entitled Document Illumination System.

BACKGROUND OF THE INVENTION

This invention relates to a system for scanning a document, which is positioned on a flat document support. The invention has particular application to systems which scan a flat document surface and generate a series of electrical signals which are suitable for controlling an ink jet printer or other electrically operated dot matrix recorder. One such prior art system is disclosed in Paranjpe et al U.S. Pat. No. 4,112,469.

In the scanning system disclosed in Paranjpe et al there is a collimating lens, which collimates light reflected from the document surface and an imaging lens for imaging a scanned portion of the document upon the face of a photodetector array. A scanning mirror is positioned between the collimating lens and imaging lens. This system has a problem in that the arcuate scanning of the flat document plane produces variations in the length of the optical path from the scanned document portion to the face of the photodetector array. This tends to defocus the observed image during portions of the scan, and to produce variations in the relative sizes of the scanned portion of the document and the detector array, which results in a geometric distortion of the dot matrix image.

One prior art system which avoids defocussing problems arising out of arcuate scanning of a flat document plane is disclosed in Herriott U.S. Pat. No. 2,262,584. Herriott teaches a scanning apparatus for facsimile recording, wherein light reflected from a portion of a flat mounted document is collimated by a moving doublet lens. The doublet lens moves in synchronism with the scanning action of the scanning mirror, so that the focal plane of the doublet lens always coincides with the portion of the document being scanned. Herriott provides another doublet lens, which is supported in a fixed position relative to a photoelectric cell. The photoelectric cell is positioned at the focal plane at the second doublet lens. The photocell views a series of side-by-side image elements arranged along a line extending across the width of the document. The document is moved on a line by line basis, as each line of image cells is scanned.

Other systems for achieving flat field scanning includes reciprocating mirrors as disclosed in Satomi U.S. Pat. No. 3,709,602 and Lloyd U.S. Pat. No. 3,752,558 and sidewardly moving lenses as disclosed in Nishiyama et al U.S. Pat. No. 3,681,527. Still other prior art systems have utilized combinations of mirrors and lenses as shown for example Yuta U.S. Pat. No. 4,025,154.

SUMMARY OF THE INVENTION

This invention provides an improved lens system for use in a scanning system of the type wherein a rotating mirror scans a flat document surface. The lens system includes a movable doublet lens, a fixed doublet lens and fixed correction lenses. The fixed lenses are mounted within a housing which is surrounded by a rotating barrel cam. As the barrel cam rotates, it moves a follower arm which is fastened to the movable doublet lens. Movement of he doublet lens is controlled by the cam so as to maintain the focal plane of the lens in coincidence with the portion of the document plane being scanned by the rotating mirror.

The movable doublet lens collimates light which is reflected from the document surface and which is directed theretoward by the rotating mirror. After being so collimated, the light passes through the correction lenses and thence through the fixed doublet lens for decollimation and imaging. The correction lenses comprise three pairs of symmetrically arranged lenses, which are configured and spaced for eliminating the various aberrations introduced by the three movable and fixed doublets. One such lens pair is a pair of identical double concave lenses, while the other two pairs are pairs of identical meniscus lenses. The movable and fixed doublet lenses are also identical, so as to achieve overall lens system symmetry.

BRIEF DESCRIPTION OF THE DRAWING

FIG. 2 is a pictorial illustration of the change in object distance associated with angular scanning of a flat document;

FIG. 3 is an illustration of an illuminated strip on a document;

FIG. 4 is a schematic front elevation view of a document scanning system;

FIG. 5 is a schematic illustration of an arrangement of lenses in accordance with this invention; and FIG. 6 is a partially cut away illustration of a lens system according to this invention.

DESCRIPTION OF THE PREFERRED EMBODIMENT

Figure 1:
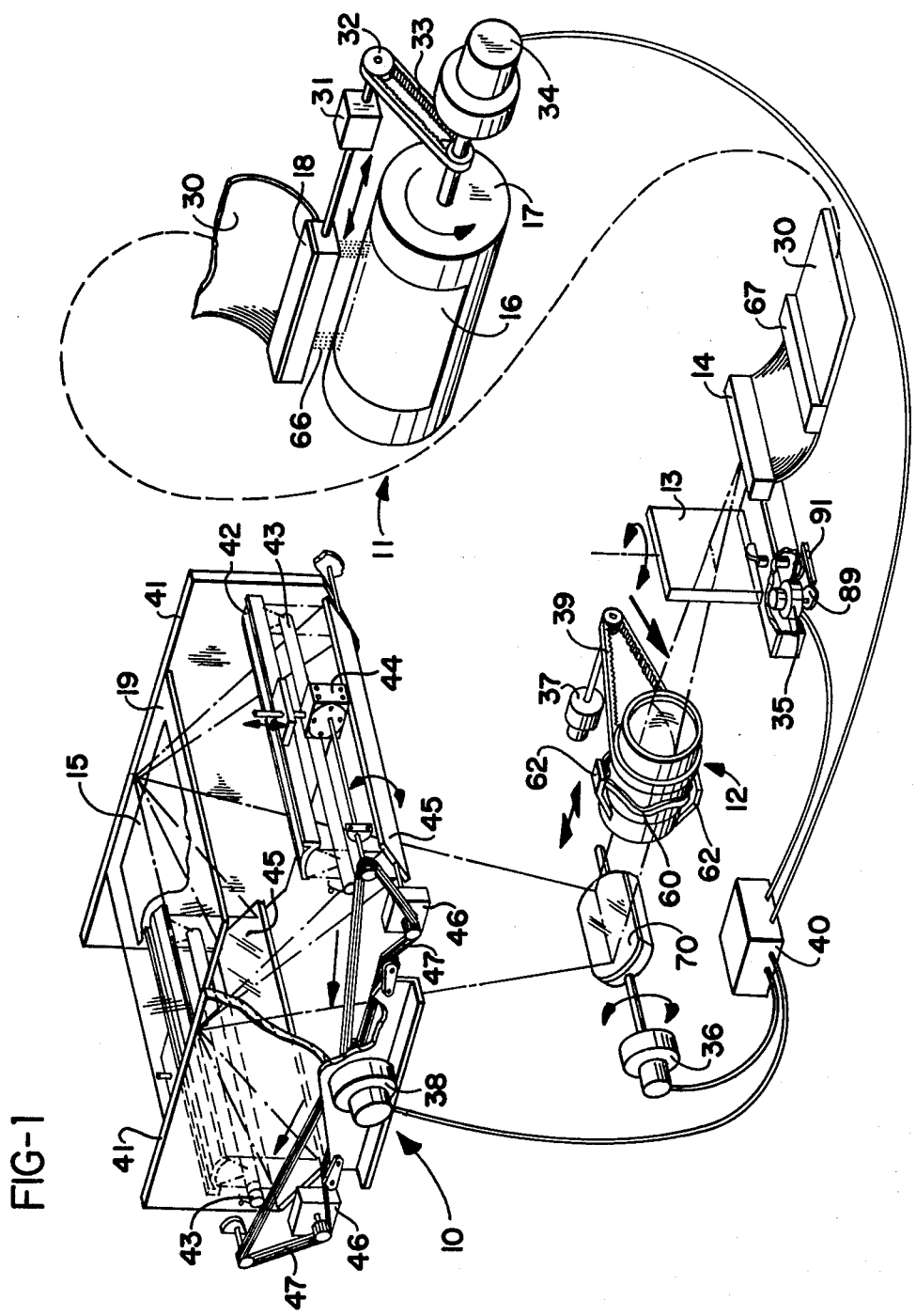
FIG. 1 is a pictorial illustration of a document reproduction system including a lens system according to this invention.

As generally illustrated in FIG. 1, a document reproduction system may comprise an illumination station 10, a scanning mirror 70 and a lens system 12, which is constructed in accordance with this invention and which is hereinafter described in detail. The document reproduction system further comprises an image shifting plate 13, a photodetector array 14 and a jet drop printer 11.

Illumination station 10 includes a flat surface 19 for supporting a document 15. The document 15 is scanned by two synchronously driven narrow beams of light, as hereinafter described, to create a narrow illuminated light strip extending across one dimension of the document. The document portion which is so illuminated is scanned by mirror 70 and imaged upon the face of photodetector array 14 by lens system 12.

Jet drop printer 11 generally comprises a rotating drum 17 and a jet print head 18. A sheet of paper 16 is delivered to drum 17 by a sheet feeder (not illustrated) and is rotated through the printing region of print head 18. Printing of the sheet 16 is accomplished by a row of jets 66 which receive printing control signals from control electronics 67 via a set of electrical cables 30. Control electronics 67 generates approaching printing control signals in response to light levels sensed by a set of photodetectors comprising the array 14. These photodetectors (not illustrated) are arranged in correspondence with the arrangement of an array of orifices used by print head 18 for generation of the jets 66.

Printing drum 17 is rotated by a drive motor 34 under control of a control unit 40. Drive motor 34 also drives a gear 32 by means of a toothed drive belt 33. Gear 32 operates a cam arrangement shown generally at 31, and cam arrangement 31 produces lateral oscillation of print head 18. Rotation of drum 17 proceeds in synchronism with the oscillation of print head 18 and the scanning of document of 15 as hereinafter described.

Scanning of document 15 will now be described with reference to FIG. 3, wherein the document 15 is illustrated as being positioned upon a supporting glass plate 69 within the support surface 19. Document 15 is illuminated by an elongated beam of light to create a narrow illuminated strip 20 extending laterally across the document in a first direction parallel to the directional arrow 22. The beam of illuminating light is scanned longitudinally across document 15 in a second direction as indicated by the arrow 21.

Apparatus for creating and scanning the illuminated strip 20 is shown schematically in FIG. 4 as including a pair of illuminating lamps 43, 43, a pair of focussing reflectors 42, 42, and a pair of flat reflecting mirrors 45, 45. The illuminating lamps 43, 43, extend transversely across illuminating station 10, as best illustrated in FIG. 1. Light which is generated by lamps 43, 43, is focussed by focussing reflectors 42, 42, into a pair of converging light beams 85, 85. Light beams 85, 85, are directed toward mirrors 45, 45, for convergence at the surface of document 15. The convergence of beams 85, 85, at the surface of 15 defines illuminated strip 20.

Scanning of beams 85, 85, is accomplished by synchronous oscillation of mirrors 45, 45. For this purpose there are provided a pair of conjugate cam mechanisms 46, 46, as illustrated generally in FIG. 1 and described in detail in Ser. No. 075,052. A pair of timing belt assemblies 47, 47, are driven by an electric motor 38 to operate cam mechanisms 46, 46, for causing forward scanning and high speed flyback of mirrors 45, 45.

Illuminated strip 20 comprises superimposed one-dimensional images of the electrical filaments within illumination lamps 43, 43. In order to maintain one-dimensional focus of the filaments reflectors 42, 42, are moved vertically back and forth under control of conjugate cam mechanisms 44, 44. The movement of reflectors 42, 42, proceeds in synchronism with the scanning oscillations of mirrors 45, 45, so as to maintain the illuminated strip 20 at the focal lines of both of reflectors 42, 42. This produces a very narrow and intense strip of illumination. Cam mechanism 44, 44, are also driven by timing belt assemblies 47, 47, and are described more fully in Ser. No. 075,054.

Preferably reflectors 42, 42, are of generally trough shaped configuration with an elliptical crossection. This configuration produces the above mentioned one-dimensional image of the illumination filaments, without production of an observable representation of the actual structural of the electrical filaments. The creation of the intense, superimposed one-dimensional images of the electrical filaments of lamps 43, 43, is substantially enhanced by side mirrors 41, 41, as more fully described in Ser. No. 075,297.

Reflected light from illuminated strip 20 is directed toward scanning mirror 70, which projects an image of the illuminated region of the document through lens system 12 and toward the face of photodetector array 14. A D.C. electrical servometer 36 operates under control of control unit 40 to give mirror 11 an oscillating rotational motion. An optical grating on the glass 69 (not illustrated) is imaged upon one of the photodetectors to provide an appropriate feedback control signal, as described in detail in Monette Ser. No. 950,253 filed Oct. 10, 1978, now U.S. Pat. No. 4,216,378.

The rotation of mirror 70 proceeds in synchronism with the oscillating movement of mirrors 45, so that the photodetector array 14 always looks at that portion of the document which is being illuminated. Printing system drive motor 34 operates in synchronism with the forward scanning movement of scanning mirror 70. An optical scanner, (not illustrated) positioned adjacent printing drum 17, detects the positioning of paper 16, so that control unit 40 is able to assure flyback of mirrors 11 and 45 during the time while the back side of the drum is being presented to print head 18.

As described in detail in Ser. No. 075,052, the jets 66 are spaced apart by a distance which may be about four times the width of the printed track which is produced by one jet. The system achieves solid printing coverage by sideward oscillation to print head 18, as above described. This sideward oscillation of print head 18 is accompanied by rotational motion of image shifting plate 13.

As light travels from lens system 12 toward photodetector array 14, it is refracted by the plate 13. This refraction of the light beam produces a slight image shifting which corresponds with the movement of print head 18. Such image shifting proceeds under control of control unit 40. Control unit 40 is connected for control of a stepping motor 35. Stepping motor 35 rotates a cam 89, which moves a cam follower 91 to cause stepping rotation of plate 13 in steps of about 0.5 degrees.

When document 15 is scanned by scanning mirror 70, there is an accompanying variation of the optical path length, as illustrated in FIG. 2. This distance, δ, varies with the scanning angle α in accordance with the equation:

$$\delta = R(\sec \alpha - 1)$$

where R is the perpendicular distance from the scanning axis to the plane of the document 15. This path length variation creates focussing and distortion problems at the face of photodetector array 14.

The above mentioned focussing and distortion problems are solved by the lens system 12, which employs a movable doublet lens 8 and a fixed lens assembly 9, as illustrated generally in FIG. 4 and in detail in FIG. 5. Doublet lens 8 is a collimating lens and is positioned such that the surface of the document 15 is at the focal point of the lens. Lens 8 is moved in synchronism with the rotation of mirror 70, so that it produces a light beam 87, which at all times comprises collimated bundles of light rays from the different points along the length of illuminated strip 20. Lens assembly 9 images these rays on the face of photodetector array 14, and the imaging operation is entirely insensitive to variations in the distance between the doublet 8 and the lens assembly 9.

Lens assembly 9 is incorporated within a housing 63 and is supported by a support plate 72, as illustrated in FIG. 6. A barrel cam 60 rides around the housing 63 on a pair of ball bearings 77, 71. A pulley 64 is secured to cam 60 and is driven by a drive motor 37 via a timing belt 39. Drive motor 37 operates under control of control unit 40, so that barrel cam 60 rotates around housing 63 in synchronism with the rotational movement of image scanning mirror 70.

As barrel cam 60 rotates, it contacts two pairs of rollers 61 and moves them alternately back and forth in a direction parallel to the optical axis of the lens system. Rollers 66 are supported by a pair of follower arms 62, 62, which are secured to a lens frame 66 by fastening means such as screws 65. Doublet lens 8 is supported within lens frame 66, so that the rotation of pulley 64 by timing belt 39 produces axial movement of double lens 8. A pair of guide rails 66, 69 (only one such rail being visible in FIG. 6) are secured to housing 63 for supporting a pair of linear bearings 68, 68. Another pair of guide rails 67, 67 are secured to lens frame 66 in bearing relationship against bearings 68, 68. The rail and bearing arrangement thus prevent rotation of lens frame 66 and assure accurate axial movement in correspondence with variations in the contour of the cam 60.

Cam 60 is configured to produce axial movement corresponding to variations in the distance δ. Drive motor 37 produces one complete rotation of lens system 12 for each operating cycle of mirror 70. During the course of this rotation, doublet lens 8 goes through two complete movement cycles corresponding to the cyclic variations in the distance δ occurring while mirror 70 is performing its forward scanning motion. Cam 60 thus has two mirror image cam portions and rotates unidirectionally.

As illustrated in FIG. 5, lens assembly 9 comprises a pair of identical double concave lenses 1, 1, which are arranged symmetrically with respect to a plane of symmetry 73. Lens assembly 9 further comprises a pair of identical first meniscus lenses 2, 2, opposing lenses 1, 1, in symmetrical relationship with respect to the plane 73, a pair of identical second meniscus lenses 3, 3, opposing lenses 2, 2, in symmetrical relationship with respect to plane 73, and a doublet lens 7 which is positioned opposing that one of the second meniscus lenses 3 which is remote from doublet lens 8. Thus the combination of lens assembly 9 with doublet lens 8 produces a pair of lens group 6a and 6b which (for one position of doublet lens 8) are symmetrical about the plane 73.

Doublet lenses 7 and 8 each comprise a first lens element 4, which faces inwardly toward its corresponding second meniscus lens 3, and an outwardly facing second lens element 5. The doublet 8 collimates the light reflected from the surface of mirror 70 and simultaneously corrects chromatic aberration, spherical aberration and coma. Doublet 9 serves as an imaging lens and also corrects coma, distortion and lateral color. The correcting effects of doublet 9 are produced automatically by the symmetry of the system. It is a significant feature of the system that the moving doublet 8 not only collimates the light and makes the indicated corrections, but it also maintains a balance of aberration throughout its range of movement.

The double concave lenses 1, 1, the first meniscus lenses 2, 2, and the second meniscus lenses each perform a multiple correction function. Collectively these six lenses correct spherical abberation, coma, astigmatism, field curvature, distortion axial color and lateral color. These six lenses have radii $R_1$ through $R_6$ and spacings $S_1$ through $S_3$ as illustrated. Numerical values for these parameters are presented in Table A with negative values of R indicating concave surfaces and positive values of R indicating convex surfaces.

Table A also presents numerical values for the spacing S, between doublet 7 and its respective second meniscus lens 3, the axial spacing $S_5$ between the two lens elements comprising doublets 7 and 8, the range of variation of the spacing $S_6$ caused by movement of the doublet 8 and the radii $R_7$ through $R_{10}$, which characterize lens elements 4 and 5. Finally, Table A presents the thicknesses $t_1$ through $t_5$, indices of refraction $N_1$ through $N_5$, and Abbe numbers $v_1$ through $v_5$ for lens elements 1 through 5 respectively. Values for radii, spacings, and thicknesses are all expressed in inches.

Lens system 12, as herein described provides a 1:1 magnification, and the diameter of the aperture limiting lenses (lenses 1, 1) is 3.35 inches. Lens groups 6a and 6b each have a focal length of about 40 inches. All lenses are preferably coated with $MgF_2$.

| | | |
|---|---|---|
| $R_1 = -18.234$ | $v_1 = 48.76$ | $N_1 = 1.53172$ |
| $R_2 = -18.234$ | $v_2 = 43.93$ | $N_2 = 1.60562$ |
| $R_3 = -3.993$ | $v_3 = 58.52$ | $N_3 = 1.65160$ |
| $R_4 = +4.949$ | $v_4 = 60.33$ | $N_4 = 1.62041$ |
| $R_5 = -19.422$ | $v_5 = 33.85$ | $N_5 = 1.64769$ |
| $R_6 = +6.476$ | | |
| $R_7 = +25.890$ | $S_1 = .300$ | |
| $R_8 = +18.6107$ | $S_2 = .645$ | |
| $R_9 = -18.149$ | $S_3 = .200$ | |
| $R_{10} = +190.47$ | $S_4 = .250$ | |
| | $S_5 = .003$ (edge contact) | |
| | $S_6 = .250 \leftrightarrow .943$ | |
| $t_1 = .250$ | | |
| $t_2 = .600$ | | |
| $t_3 = .350$ | | |
| $t_4 = .300$ | | |
| $t_5 = .250$ | | |

What is claimed is:

1. In a flat field scanning system comprising means for illuminating a flat document plane, a scanning mirror for scanning the light which is reflected from said document plane and directing it along an optical path toward an image sensor, a movable doublet lens for collimating the light rays traversing said path, motive means for moving said movable doublet lens along said path in synchronism with the movement of said scanning mirror so as to maintain the focal plane of said doublet lens coincident with the portion of said document plane being viewed by said image sensor, and imaging means for receiving said collimated light and imaging said portion of said document plane upon said image sensing means; the improvement wherein said imaging means has a plane of symmetry which is perpendicular to said optical path and further wherein said imaging means comprises a pair of identical double concave lenses arranged symmetrically with respect to said plane of symmetry, a pair of identical first meniscus lenses opposing said double concave lenses in symmetrical relationship with respect to said plane of symmetry, a pair of identical second meniscus lenses opposing said first meniscus lenses in symmetrical relationship with respect to said plane of symmetry, and a fixed position doublet lens identical to said movable doublet lens and opposing that one of said second meniscus lenses which is remote from said movable doublet lens.

2. Apparatus according to claim 1 wherein said imaging means includes a common housing for supporting the lenses which are component parts of said imaging means.

3. Apparatus according to claim 2 wherein said motive means comprises a barrel cam surrounding said housing, a pair of cam following rollers, a follower arm which supports said rollers in opposed relationship against said cam, and fastening means for fastening said follower arm to said movable doublet lens.

4. Apparatus according to claim 3 wherein said motive means comprises a pulley surrounding said housing, a timing belt engaging said pulley, and a drive motor for driving said timing belt.

5. Apparatus according to claim 4 wherein said cam has two mirror image cam portions and further wherein said motive means rotates said housing unidirectionally about said optical axis once for every two cycles of said scanning mirror.

6. Apparatus according to any of claims 1 through 5 wherein:

said double concave lenses have radii $R_1$ and $R_2$, thickness of $t_1$, indices of refraction $N_1$, and Abbe numbers $\nu_1$, said first meniscus lenses are spaced apart from said double concave lenses by a distance $S_2$ and have radii $R_3$ and $R_4$, thickness $t_2$, indices of refraction $N_2$ and Abbe numbers $\nu_2$, and said second meniscus lenses are spaced apart from said first meniscus lenses by a distance $S_3$ and have Radii $R_5$ and $R_6$, thicknesses $t_3$, indices of refraction $N_3$ and Abbe numbers $\nu_3$, said radii, thicknesses, indices of refraction, Abbe numbers and distances having values substantially:

$R_1 = -18.234$ in.
$R_2 = -18.234$ in.
$R_3 = -3.993$ in.
$R_4 = +4.949$ in.
$R_5 = -19.422$ in.
$R_6 = +6.476$ in.

$S_2 = 0.645$ in.
$S_3 = 0.200$ in.

$\nu_1 = 48.76$
$\nu_2 = 43.93$
$\nu_3 = 58.52$ $t_1 = 0.250$ in.
$t_2 = 0.0600$ in.
$t_3 = 0.350$ in.

$N_1 = 1.53172$
$N_2 = 1.60562$
$N_3 = 1.65160$.

7. Apparatus according to claim 6 wherein said doublet lenses comprise first lens elements facing said second meniscus lenses and second lens elements remote from said second meniscus lenses, said first lens elements having radii $R_7$ and $R_8$, thickness $t_4$, indices of refraction $N_4$ and Abbe numbers $\nu_4$, and said second lens elements having radii $R_9$ and $R_{10}$, thicknesses $t_5$, indices of refraction $N_5$ and Abbe numbers $\nu_5$;

said radii, thicknesses, indices of refraction and Abbe numbers having values substantially:

$R_7 = +25.890$ in.
$R_8 = +18.6107$ in.
$R_9 = -18.149$ in.
$R_{10} = +190.47$ in.

$t_4 = 0.300$ in.
$t_5 = 0.250$ in.

$N_4 = 1.62041$
$N_5 = 1.64769$ $\nu_4 = 60.33$
$\nu_5 = 33.85$.

8. Apparatus according to claim 7 wherein said double concave lenses are spaced apart by a distance $S_1$ and said stationary doublet lens is spaced from its corresponding second meniscus lens by a distance $S_4$; said distances having values substantially:

$S_1 = 0.300$
$S_2 = 0.645$.

9. Apparatus according to claim 8 wherein said movable doublet is moved to have a distance from its corresponding second meniscus lens which varies between about 0.250 in. and about 0.943 in.

10. In a flat field document scanning system, improved lens apparatus arranged along a common optical axis and comprising:

a movable doublet lens, for image collimation;
a lens housing;
a fixed doublet lens mounted within said housing for image focussing;
fixed correction lenses mounted within said housing for correcting spherical abberation, coma, astigmatism, field curvature, distortion, axial color and lateral color,
a barrel cam surrounding said housing,
a pair of cam following rollers,
a follower arm supporting said rollers in opposed relationship against said cam,
fastening means for fastening said movable doublet lens to said follower arm,
and means for rotating said housing about said optical axis.

* * * * *

UNITED STATES PATENT AND TRADEMARK OFFICE
CERTIFICATE OF CORRECTION

PATENT NO. : 4,266,252
DATED : May 5, 1981
INVENTOR(S) : Arthur Cox et al

It is certified that error appears in the above-identified patent and that said Letters Patent are hereby corrected as shown below:

Column 1, line 68, "he" should be --the--.

Column 2, line 61, "approaching" should be --appropriate--.

Column 3, line 33, "075,052" should be --075,054--.

Column 3, line 44, "oscillations" should be --oscillation--.

Column 3, line 55, "structural" should be --structure--.

Column 5, line 2, "Rollers 66" should be --Rollers 61--.

Column 5, line 37 "group" should be --groups--.

Column 5, line 64, "S," should be --$S_4$--.

Signed and Sealed this

Twenty-first Day of July 1981

[SEAL]

Attest:

GERALD J. MOSSINGHOFF

Attesting Officer

Commissioner of Patents and Trademarks